United States Patent [19]

Tanaka

[11] Patent Number: 4,644,611
[45] Date of Patent: Feb. 24, 1987

[54] SNAP HOOK

[75] Inventor: Toshie Tanaka, Tama, Japan

[73] Assignee: Nifco, Inc., Yokohama, Japan

[21] Appl. No.: 799,487

[22] Filed: Nov. 19, 1985

[30] Foreign Application Priority Data

Nov. 29, 1984 [JP] Japan ............... 59-180026[U]

[51] Int. Cl.⁴ ............................................. A44B 13/02
[52] U.S. Cl. ........................................ 24/231; 24/239;
24/241 S; 24/241 SB
[58] Field of Search .................. 24/231, 241 R, 241 S,
24/241 SB, 239, 324

[56] References Cited

U.S. PATENT DOCUMENTS

| 130,033 | 7/1872 | Flagg | 24/241 SB |
| 954,216 | 4/1910 | Schleicher | 24/231 |
| 1,208,408 | 12/1916 | Updegraph | 24/231 |
| 1,879,168 | 9/1932 | Freysinger | 24/241 SB |
| 1,949,608 | 3/1934 | Johnson | 24/241 SB |
| 2,419,947 | 5/1947 | Foreman | 24/239 |
| 3,973,301 | 8/1976 | Buhr | 24/239 |
| 4,122,585 | 10/1978 | Sharp et al. | 24/241 SB |
| 4,528,728 | 7/1985 | Schmidt et al. | 24/241 S |

OTHER PUBLICATIONS

Mathias Klein & Sons, Catalog No. 39, Jul. 1943, two pages.

Primary Examiner—Victor N. Sakran
Attorney, Agent, or Firm—Trexler, Bushnell & Wolters, Ltd.

[57] ABSTRACT

A snap hook comprises a base member having a J-shaped hook and a flexible member, and a slider mounted on the base member for movement in directions perpendicular to the longitudinal direction of the base member to open and close the J-shaped hook, wherein the hook is normally held closed by the slider biased by the flexible member, and when the slider is depressed with a ring or the like, the slider is moved inwardly to open the hook so that the ring or the like can be hooked.

3 Claims, 6 Drawing Figures

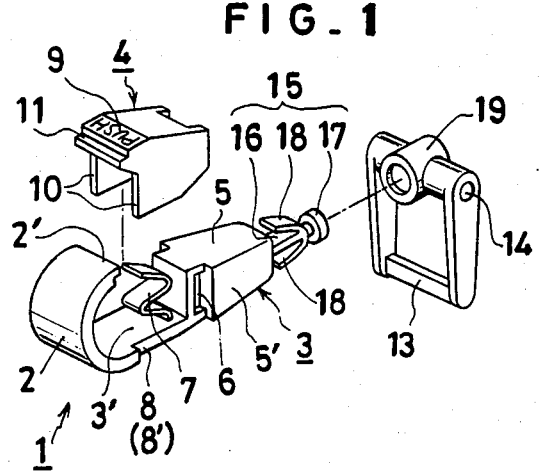
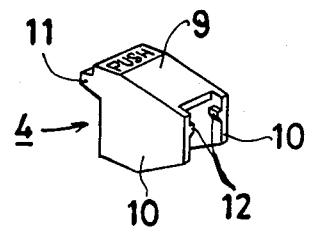
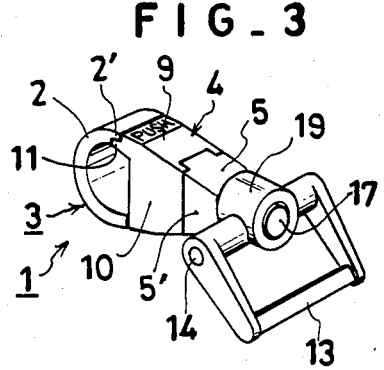
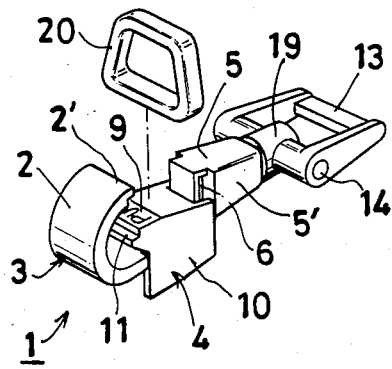
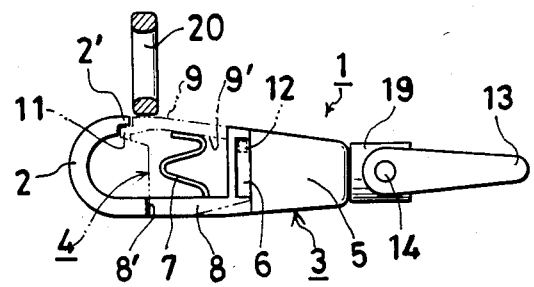
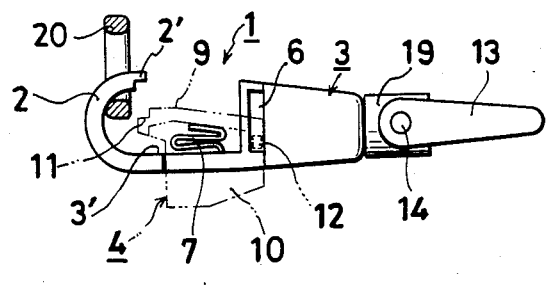

SNAP HOOK

FIELD OF THE INVENTION AND RELATED ART STATEMENT

This invention relates to a plastic snap hook for retaining a ring or like object and, more particularly, to a snap hook for retaining a metal ring or the like provided on a strap to be detachably mounted on a bag or the like.

Various snap hooks of such type have been proposed and discriptions thereof can be found, for instance, in Japanese Utility Model Publication No. SHO 57-24985 and Japanese Utility Model Application Public Disclosure No. SHO 59-17314.

The snap hook disclosed in the former publication comprises a base member having a hook provided at one end, a slider slidable back and forth along the base member in the longitudinal direction thereof and a coil spring biasing the slider toward the tip of the hook. The slider is moved into contact with and away from the hook tip. An O- or D-ring or like object can be detachably retained in the hook of the base member by operating the slider.

However, since this snap hook includes the coil spring in addition to the base member and the slider, its structure is rather complicated, and its assembly is rather troublesome. Further, since the base member has to have a space for movement of the slider in its longitudinal direction, the snap hook inevitably has a considerably large length, resulting in a large overall size. Further, the operation of hooking an object in the hook is not so simple. More specifically, the slider first has to be pulled away from the hook by the finger. After the hook has been opened in this way, the object is fitted in the hook. That is, the object cannot be hooked in the hook by a single operation.

The snap hook disclosed in the latter publication mentioned above comprises a base member having a hook provided at one end and an elastic pawl integrally extending from a stem of the base member toward the hook. Normally, the tip of the elastic pawl is held in contact with the inner surface of the hook by a spring force to have the hook closed.

The hook is opened and closed by moving the end of the elastic pawl away from and into contact with the hook. The hook thus can be opened with a light force applied to the elastic pawl by depressing a portion thereof near the tip with the finger. However, the object is inserted into and taken out of the snap hook between the tip of the elastic pawl and the hook. Therefore, if a portion of the elastic pawl near the tip thereof is held depressed with the finger, the finger will constitute an obstacle to insertion or removal of the object. To avoid this, a portion of the elastic pawl near the stem thereof has to be depressed. This means that a strong force must be appolied to the elastic pawl when inserting or taking out the object. Otherwise, the finger depressing the elastic pawl constitutes an obstacle particularly when taking out the object from the hook.

SUMMARY AND OBJECT OF THE INVENTION

An object of the invention is to provide a snap hook, which permits a ring or like object to be reliably hooked in and taken out of a hook with a simple operation, and which also permits reduction of the size of the snap hook.

To attain the above object of the invention, there is provided a plastic snap hook, which comprises a base member having a J-shaped hook provided at one end and a slider movable along the base member in directions perpendicular to the longitudinal direction of the base member, and in which an object is hooked in the J-shaped hook of the base member by moving the slider. The base member is provided at an intermediate point of its longitudinal direction with a flexible member. The slider has an end portion cooperating with the free end of the J-shaped hook, an operating portion with the inner surface thereof urging the flexible member at all times, and side portions extending from the opposite sides of the operating portion and in frictional contact with the opposite sides of the base member. The frictional contact surfaces of the base member and slider are provided with coupling means such that they are coupled together for relative movement in directions perpendicular to the longitudinal direction of the base member. The coupling means permits the slider to be moved along the base member between a position at which the hook is open and a position at which the hook is closed.

To hook an object such as a ring in the J-shaped hook, the hook is opened by pushing the slider. The slider may be pushed either with the finger or with the object. In the latter case, the object can be inserted into the J-shaped hook as soon as the hook is opened.

More specifically, when the outer surface of the operating portion of the slider is depressed with the object, the slider is moved toward the corresponding portion of the base member. At this time, the slider is guided along the opposite sides of the base member by coupling means provided on the frictional contact surfaces of the slider and base member. Also at this time, the flexible member provided on the base member is compressed against its elasticity by the inner surface of the operating portion of the slider. As the slider is depressed, its end portion is inwardly separated from the tip of the J-shaped hook, thus opening the hook.

As soon as the hook is opened, the object may be moved along the outer surface of the operating portion of the slider toward the gap formed between the tip of the J-shaped hook and the end portion of the slider, whereby the object is fitted into the J-shaped hook through the gap mentioned above.

When the object is fitted into the hook, the urging force on the operating portion of the slider is released. The slider is thus moved away from the corresponding portion of the base member along the opposite sides thereof by the elastic force of the flexible member urging the inner surface of the operating portion of the slider. The end portion of the slider is thus elastically click engaged with the end of the J-shaped hook from the inner side thereof, thus closing the hook.

To take out the ring from the hook, the hook is again opened. The hook may be opened by depressing the operating portion of the slider with the finger. In this case, however, the finger depressing the slider is liable to interfere with the operation of taking out the object from the hook. To avoid this, the slider may be moved by holding its opposite sides with the fingers. In this case, the object can be readily taken out of the hook when the hook is opened. Then, only the fingers may be released from the opposite sides of the slider. As a result, the slider is again moved back into click engagement with the tip of the J-shaped hook to close the hook by the elastic force of the flexible member.

BRIEF DESCRIPTION OF THE DRAWINGS

FIG. 1 is an exploded perspective view showing a snap hook embodying the invention;

FIG. 2 is a perspective view showing a slider viewed from a different angle;

FIG. 3 is a perspective view showing the snap hook in the assembled state;

FIG. 4 is a perspective view showing the snap hook operated to hook a ring member; and FIGS. 5(a) and 5(b) are views for explaining the operation of the snap hook, with a J-shaped hook in the closed state in FIG. 5(a) and in the open state in FIG. 5(b).

DETAILED DESCRIPTION OF THE PREFERRED EMBODIMENT

The snap hook according to the invention will now be described in detail in conjunction with the illustrated embodiment thereof.

Reference numeral 1 generally designates the snap hook, which comprises two parts, i.e. a base member 3 having a J-shaped hook 2 provided at one end and a slider 4 movable along the base member 3 in directions perpendicular to the longitudinal direction of the base member 3. The base member 3 and slider 4 are made as plastic moldings.

The stem of the J-shaped hook 2 of the base member 3 extends as a plate-like portion and terminates in a substantially rectangular portion 5 at the other end. The opposite sides 5' of the rectangular portion 5 are formed with perpendicular grooves 6, which extend in a direction perpendicular to the longitudinal direction of the base member 3 and are closed at the opposite ends. The grooves 6 define the range of movement of the slider 4. The base member 3 is provided on the upper surface 3' of its longitudinally intermediate portion with a flexible member 7. The flexible member 7 extends obliquely toward the tip 2' of the J-shaped hook 2. In the illustrated embodiment, the flexible member 7 is folded at intermediate portions in its length direction, so that it is zigzag-shaped or substantially M-shaped. However, it is possible to use a flat member without any folded portion instead of the illustrated flexible member 7. The free end of the flexible member 7 is in contact with the inner surface of the slider 4 and outwardly biases the slider 4.

In the illustrated embodiment, a longitudinally intermediate portion of the base member 3 where the slider 4 is mounted is provided on opposite sides with notches 8' to form a slider mounting portion 8 having a reduced width. With this structure, the slider 4 mounted on the base member 3 does not protrude sidewise from the base member 3, that is, the opposite sides of the slider 4 are flush with the opposite sides of the base member 3.

The slider 4 is mounted on the slider mounting portion 8 of the base member 3 in a direction perpendicular to the longitudinal direction of the base member 3. The slider 4 has a channel-shaped sectional profile. More specifically, the slider 4 has a substantially hill-shaped operating portion 9 which can be readily depressed with the finger, and opposite side portions 10 extending from the opposite sides of the operating portion 9. The slider 4 further has a stepped end portion 11, which can engage the tip 2' of the hook 2 from the inner side thereof. The side portions 10 of the slider 4 are provided with protuberances 12 projecting from the inner surface. The protuberances 12 are received in the perpendicular grooves 6 of the base member 3.

The end of the substantially rectangular portion 5 of the base member 3 remote from the J-shaped hook 2 is coupled by snap coupling to a shaft portion 14 of a D-shaped ring 13, to which a belt, a band or the like is attached.

More specifically, an anchor-shaped leg 15 extends from the end of the portion 5. The leg 15 consists of a shaft portion 16 extending from the end of the portion 5, a disk-like lid portion 17 provided on the free end of the shaft portion 16 and a pair of elastic portions 18 extending from a portion of the shaft portion 16 adjacent to the lid portion 17 in a mutually flaring fashion toward the portion 5. The transversal center of the shaft portion 14 of the D-shaped ring 13 is provided with a hollow cylindrical portion 19. The leg portion 15 is fitted in the hollow cylindrical portion 19.

In this embodiment, the three parts i.e., the base member 3 having the J-shaped hook 2, the slider 4 and the D-shaped ring 13, are assembled together as a snap fastener 1.

The slider 4 may be mounted on the slider mounting portion 8 of the base member 3 by fitting it on the portion 8 with its opposite sides 10 slightly spread from each other. When the protuberances 12 of the side portions 10 of the slider 4 are received in the perpendicular grooves 6 of the base member 3, the side portions 10 of the slider 4 slightly close toward each other by their elasticity to restore the initial form of the slider 4. The protuberances 12 of the slider 4 are now restrained in the perpendicular grooves 6 of the base member 3 for movement along the grooves 6.

Further, when the slider 4 is mounted, the inner surface 9' of its operating portion 9 engages and slightly pushes the flexible member 7 provided on the base member 3. The inner surface 9' of the operating portion 9 of the slider 4 mounted on the base member 3 thus is outwardly biased by the flexible member 7. Normally, therefore, the end portion 11 of the slider 4 is held urged against the tip 2' of the hook 2 from the inner side. That is, the hook 2 is normally closed.

The D-shaped ring 13 is coupled to the base member 3 by inserting the leg portion 15 of the base member 3 into the hollow cylindrical portion 19 of the D-ring 13. The bore of the hollow cylindrical portion 19 has a reduced diameter portion (not shown) provided adjacent to or near the end, from which the leg portion 15 is inserted. As the leg portion 15 is inserted, the elastic portions 18 thereof are inwardly flexed by their engagement with the edge of the bore of the portion 19. When the flexed elastic portions 18 clear the reduced diameter portion of the bore, they are expanded to click engage with the inner wall of the portion 19. The bore of the portion 19 is thus closed by the lid portion 17. In this state, the leg portion 15 is retained in the portion 19 such that it cannot be taken out in the reverse direction. The base member 3 is rotatable about the shaft portion 16. The D-shaped ring 13 and base member 3 are swingable about the shaft portion 14 of the D-shaped ring 13 in directions perpendicular to the direction of rotation noted above. The D-shaped ring 13 and base members 3 thus have a large degree of freedom of relative movement, so that it is possible to easily remove any twist in a belt or the like attached to the D-shaped ring.

The operation of the snap hook having the above construction for hooking an object, e.g., an O- or D-shaped ring member 20, in the hook and removing the object therefrom, will now be described.

To hook a ring 20, the J-shaped hook 2 is opened by pushing the operating portion 9 of the slider 4 either with the finger or with the ring 20. In the latter case, the ring 20 can be inserted into the J-shaped hook 2 as soon as the hook 2 is opened.

When the outer surface of the operating portion 9 of the slider 4 is pushed with the ring 20, the slider 4 is moved toward the corresponding portion of the base member 3 against the elastic force of the flexible member 7. As the operating portion 9 is depressed, its inner surface 9' inwardly pushes the flexible member 7 and compresses it so that it is folded closely. At this time, the protuberances 12 of the side portions of the slider 4 are moved along the perpendicular grooves 6 of the sides 5' of the rectangular portion 5 of the base member 3 toward the longitudinally intermediate plate-like portion thereof. With the movement of the slider 4, the end portion 11 thereof is separated inwardly from the top 2' of the hook 2 to open the J-shaped hook 2.

In this state, the ring 20 may be quickly inserted into the open hook 2 by moving the ring 20 along the operating portion 9 toward the tip 2' of the hook 2 while continually applying the inward pushing force to the ring 20. When the ring 20 is inserted in the hook 2, the operating portion 9 is released from the inward force. The slider 4 is thus outwardly moved by the elastic force of the flexible member 7. The end portion 11 of the slider 4 is thus elastically click engaged with the end 2' of the J-shaped hook 2 from the inner side thereof, that is, the slider 4 is returned to its position closing the hook 2. In this way, the ring 20 is hooked in the J-shaped hook 2.

To take out the ring 20 from the hook 2, the operating portion 9 of the slider 4 may be depressed with the finger as described before. So that the finger will suffer no interference with the removal, however, the slider 4 may be grasped at the opposite sides 10 thereof with two fingers and pulled down.

With the inward movement of the slider the hook 2 is opened again. With the opposite sides 10 of the slider 4 held by the fingers, the ring 20 can be readily taken out of the hook 2 past the tip 2' thereof without being interfered with the fingers.

When the ring 20 has been taken out, the fingers are released from the sides 10 of the slider 4, whereby the slider 4 is returned to the initial position to close the hook 2 by the elastic force of the flexible member 7.

In the above embodiment, the perpendicular grooves 6 are provided on the side of the base member 3 and the protuberances 12 on the side of the slider 4 as means of coupling the base member 3 and slider 4. However, to the same end, it is also possible to provide protuberances on the side of the base member and perpendicular grooves on the side of the slider.

If the base member 3 and slider 4 are made of plastic materials having different colors, the operating portion 9 of the slider 4 can be perceived at a glance. In addition, the use of different colors will have a decorative effect.

As has been described in the foregoing, the snap hook according to the invention comprises two components, i.e., the base member and the slider, with the base member provided with the integral flexible member for biasing the slider. It is thus possible to provide a plastic snap hook which has a simple structure and can be very readily assembled.

In addition, the slider is moved in directions perpendicular to the longitudinal direction of the base member. Therefore, the length of the base member can be reduced compared to the case of the structure where a slider is moved back and forth in the longitudinal direction of a base member. It is thus possible to reduce the size of the whole snap hook.

Further, the slider may be moved either by depressing its operating portion with the finger or by pulling it with its opposite sides held by two fingers. The operation is thus easy compared to the case where the elastic pawl is depressed with the finger as mentioned before. Particularly, the object, such as a ring, can be readily taken out without interference from any finger.

What is claimed is:

1. A snap hook comprising a base member having a longitudinal axis and including a body and a J-shaped hook extending from said body in the direction of the longitudinal axis, said J-shaped hook having a stem integral with and extending from said body and a curved end on said stem remote from and curving back toward said body, and a slider mounted on said base member for rectilinear movement relative thereto transversely of said longitudinal axis, one of said body and said slider having rectilinear guide track means thereon and the other thereof having structure interfitting with said guide track means for rectilinear movement of said slider relative to said body, said slider having an end portion cooperating with the curved end of said J-shaped hook for releasably closing said hook, and a resilient member acting between said base member and said slider for moving said slider to hook closing position.

2. A snap hook as set forth in claim 1 wherein said body has a pair of elongated recesses respectively on opposite sides of said body and oriented transversely of said longitudinal axis and comprising said guide track means, and wherein said slider has a pair of confronting projections respectively received in said recesses.

3. A snap hook as set forth in claim 1 and further including a swivel having a bore with a reduced diameter portion, and wherein said base member has a leg extending from said body and having snap-in resilient projections thereon received in said bore beyond said reduced diameter portion.

* * * * *